(12) United States Patent
Martynenko et al.

(10) Patent No.: US 11,546,371 B2
(45) Date of Patent: *Jan. 3, 2023

(54) SYSTEM AND METHOD FOR DETERMINING ACTIONS TO COUNTER A CYBER ATTACK ON COMPUTING DEVICES BASED ON ATTACK VECTORS

(71) Applicant: AO Kaspersky Lab, Moscow (RU)

(72) Inventors: Vladislav V. Martynenko, Moscow (RU); Alexey M. Romanenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 218 days.

This patent is subject to a terminal disclaimer.

(21) Appl. No.: 17/130,419

(22) Filed: Dec. 22, 2020

(65) Prior Publication Data
US 2021/0152592 A1  May 20, 2021

Related U.S. Application Data

(63) Continuation of application No. 16/012,014, filed on Jun. 19, 2018, now Pat. No. 10,904,283.

(51) Int. Cl.
*H04L 9/40* (2022.01)
*H04L 67/50* (2022.01)
*H04L 41/0893* (2022.01)
*H04L 67/51* (2022.01)

(52) U.S. Cl.
CPC ...... *H04L 63/1441* (2013.01); *H04L 41/0893* (2013.01); *H04L 63/1416* (2013.01); *H04L 63/1425* (2013.01); *H04L 67/51* (2022.05); *H04L 67/535* (2022.05)

(58) Field of Classification Search
CPC ............... H04W 12/02; H04L 63/1441; H04L 63/14–1491; H04L 41/0893; H04L 67/51; H04L 67/535; G06F 21/55–568; G06F 21/6245–6263
See application file for complete search history.

(56) References Cited

U.S. PATENT DOCUMENTS

| 9,654,485 | B1 | 5/2017 | Neumann | |
|---|---|---|---|---|
| 9,754,106 | B2 | 9/2017 | Roundy | |
| 10,904,283 | B2* | 1/2021 | Martynenko | G06F 21/568 |
| 11,030,562 | B1* | 6/2021 | Dean | G06Q 50/265 |

(Continued)

*Primary Examiner* — Matthew T Henning
(74) *Attorney, Agent, or Firm* — ArentFox Schiff LLP; Michael Fainberg (57) ABSTRACT

Disclosed are systems and methods for countering a cyber-attack on computing devices by means of which users are interacting with services, which store personal data on the users. Data is collected about the services with which the users are interacting by means of the devices, as well as data about the devices themselves. The collected data is analyzed to detect when a cyber-attack on the devices is occurring as a result of a data breach of personal data on users from the online service. A cluster of the computing devices of different users of the online service experiencing the same cyber attack is identified. Attack vectors are identified based on the characteristics of the cyber attack experienced by the computing devices in the cluster. Actions are selected for countering the cyber-attack based on the identified attack vector and are sent to the devices of all users of the corresponding cluster.

20 Claims, 4 Drawing Sheets

(56) References Cited

U.S. PATENT DOCUMENTS

| | | | |
|---|---|---|---|
| 2008/0141371 A1* | 6/2008 | Bradicich | G06F 21/56 |
| | | | 726/23 |
| 2016/0191553 A1 | 6/2016 | Ushida et al. | |
| 2017/0063885 A1 | 3/2017 | Wardman et al. | |
| 2017/0126627 A1 | 5/2017 | Yang et al. | |
| 2018/0063175 A1 | 1/2018 | Kandala et al. | |

* cited by examiner

SYSTEM AND METHOD FOR DETERMINING ACTIONS TO COUNTER A CYBER ATTACK ON COMPUTING DEVICES BASED ON ATTACK VECTORS

CROSS-REFERENCE TO RELATED APPLICATIONS

This application is a continuation of prior U.S. patent application Ser. No. 16/012,014, filed Jun. 19, 2018, the entire contents of which is incorporated herein by reference.

FIELD OF TECHNOLOGY

The present disclosure relates to computer security and solutions for protecting the computing devices of users against computer attacks by hackers, more specifically, to systems and methods for determining actions to counter a cyber attack based on attack vectors.

BACKGROUND

At present, the service sector has expanded significantly thanks to information technologies (IT). Large service providers provide both IT support and ordinary services with the use of IT (such as email services or social networks, purchases and payments via the Internet). Most companies have an infrastructure which uses IT services, wherein the data of users is often stored in databases in this infrastructure. With the use of such databases, a fitness club for example may notify users as to events or discounts, and also inform users about their subscriptions coming to an end or receive feedback from the users as to the quality of the services provided.

Along with the diversity of IT services at present, the number of malicious cyber attacks on them from hackers is also steadily growing. In event of a successful attack, the hackers gain access to the personal data of the users, which may cause financial or mental harm to the user. On one hand, the registration of users with services is necessary (at least to prevent cases of misconduct). On the other hand, each service contains a database storing data of the users making use of that service, and therefore the data may become accessible as a result of a successful attack on that service.

So-called targeted attacks are frequently carried out on such services. Targeted attacks are directed attacks against a specific service provider, company, organization or government agency. The developers of security applications offer solutions for countering such attacks. For example, the known systems for countering targeted attacks classify the security events associated with a particular company, identify a targeted attack, and take steps to counter such an attack.

However, it is practically impossible to prevent all leakage of data about the users from such services. As a result of database leaks in the event of a successful attack, the users of the service frequently come up against subsequent attacks on their devices, such as intrusive calls, spam emails and SMS messages, malicious files, and phishing links. It should be noted that in this case the attack is not explicitly related to the device model or the type of operating system, since the users of the service are related in fact by the service, and not by any specific hardware or software.

SUMMARY

The present disclosure describes a system and a method which solve the described problems of protecting devices of users in the event of data leakage from services with which the user is interacting by means of said devices.

According to one aspect of the present disclosure, a computer-implemented method is provided for countering a cyber attack on computing devices of users interacting with an online service that stores personal data of the users. The method includes collecting, by a security server, service data associated with the online service and device data of the computing devices, and detecting, by the security server, based at least on the collected service data, a data breach, at the online service, of the personal data of the users. The method further includes detecting, by the security server, based at least on the collected service data and device data, a cyber attack on one or more computing devices related to the data breach at the online service, and identifying, by the security server, a cluster of the computing devices of different users of the online service experiencing the same cyber attack. The method also includes identifying, by the security server, from the device data of computing devices in the cluster, attack vectors based on the characteristics of the cyber attack experienced by one or more computing devices in the cluster, and determining, by the security server, one or more actions for countering the cyber attack based on the identified attack vector. The method includes transmitting, by the security server, to the computing devices in the cluster, the determined actions for countering the cyber attack.

In another aspect, identifying, by the security server, the attack vectors of the cyber attack based on the collected device data includes determining a source of the cyber attack, the source of the cyber attack comprising the service with which a user is interacting using one or more computing devices or the service from which malicious files were obtained using the one or more computing devices.

In another aspect, the cyber attack is identified based on a plurality of heuristic rules for detecting a cyber attack.

In another aspect, identifying, by the security server, the attack vectors of the cyber attack based on the collected device comprises determining a type of malicious action, and/or determining instruments of the malicious action.

In another aspect, identifying, by the security server, the attack vectors of the cyber attack based on the collected device data comprises determining that a group of elements are the target of the cyber attack, wherein the group of elements includes an email address of a user and a telephone number of the user.

In another aspect, the collected service data includes a publicly-accessible leaked database of at least a portion of the personal data of the users.

In another aspect, the method further includes determining, by the security server, whether the cyber attack was previously identified using one or more of the plurality of heuristic rules, and identifying, by the security server, one or more previously determined actions for countering the cyber attack based on the one or more of the plurality of heuristic rules.

In another aspect, the method further includes receiving information from users indicating users' hypotheses on a source of the detected data breach.

According to another aspect of the present disclosure, a system is provided for countering a cyber attack on computing devices of users interacting with an online service that stores personal data of the users. The system includes a hardware processor configured to collect service data associated with the online service and device data of the computing devices, and to detect, based at least on the collected service data, a data breach, at the online service, of the personal data of the users. The processor is further configured to detect, based at least on the collected service data and device data, a cyber attack on one or more computing devices related to the data breach at the online service, and to identify a cluster of the computing devices of different users of the online service experiencing the same cyber attack. The processor is also configured to identify from the device data of computing devices in the cluster, attack vectors based on the characteristics of the cyber attack experienced by one or more computing devices in the cluster, and to determine one or more actions for countering the cyber attack based on the identified attack vector. The processor is configured to transmit to the computing devices in the cluster, the determined actions for countering the cyber attack.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for countering an attack on computing devices by means of which users are interacting with services keeping data on the users. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

"System modules" refers, in the present disclosure, to real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and a set of program instructions, and also on neurosynaptic chips. The functionality of such system modules may be realized solely by hardware, and also in the form of a combination, where some of the functionality of the system modules is realized by software, and some by hardware. In certain variant aspects, some or all of the modules may be executed on the processor of a computer (such as the one shown in FIG. 4). The system components (each of the modules) may be realized either within a single computing device or spread out among several interconnected computing devices.

"Computer attack (hereafter, an attack)" refers, in the present disclosure, to a targeted unauthorized action on the information, the resources of an automated information system or the obtaining of unauthorized access thereto by using software and/or hardware.

Figure 1:
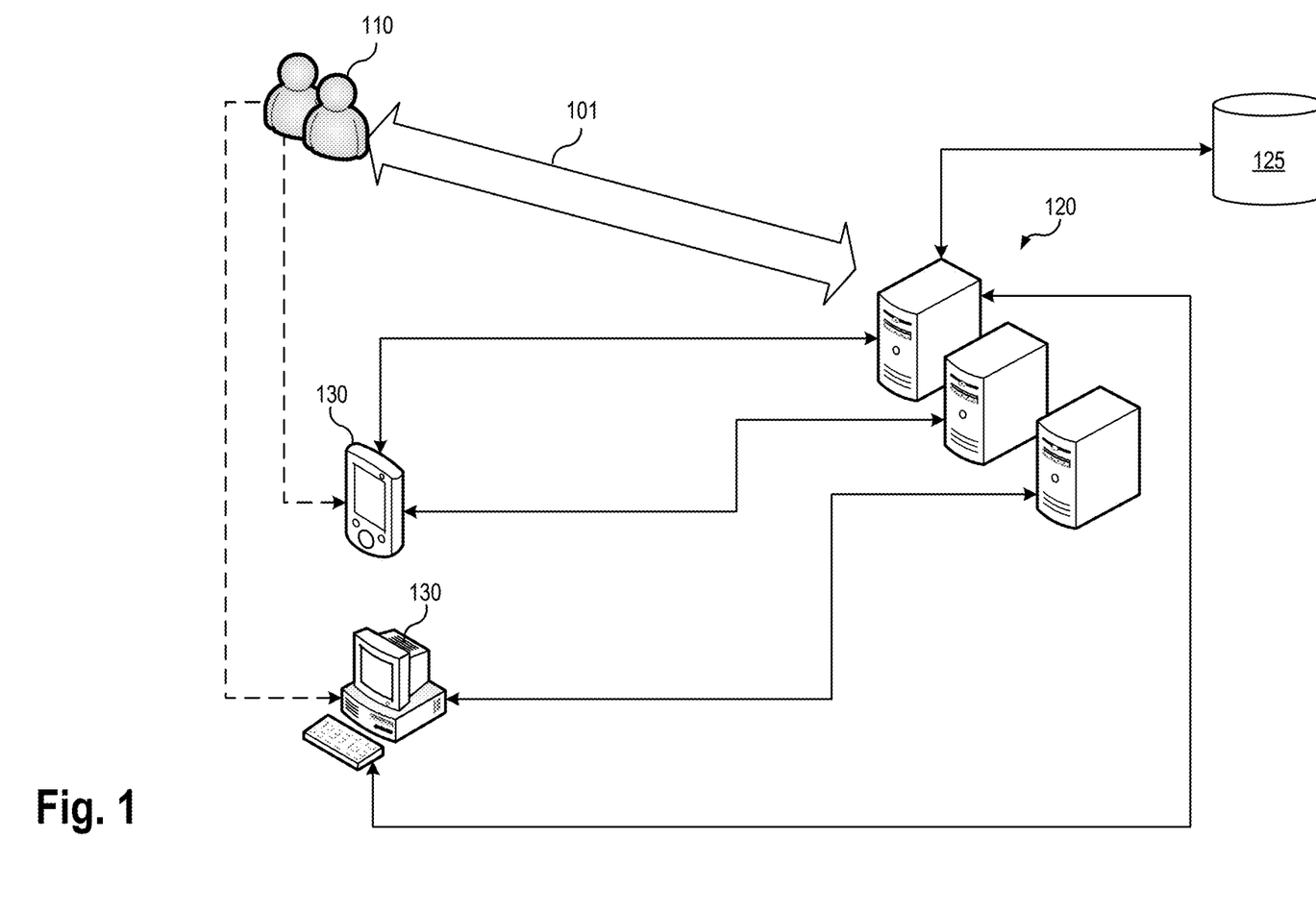
FIG. 1 shows a block diagram of an interaction of a user with services keeping data on the users according to an aspect.

FIG. 1 shows a block diagram of an interaction 101 of a user with services keeping data on the users according to an aspect. The interaction 101 of a user 110 with services 120 keeping data on users (hereinafter, services) is generally done with the use of computing devices 130 (hereinafter, devices). The devices 130 may be a smartphone, a computer, or a tablet PC. Generally, the interaction 101 is two-way (the interaction occurring or being initiated either by the user 110 or by the services 120). For example, the user 110 may access a particular service 120 by means of an account record, and the service 120 may inform the user 110 by sending messages to the email or the mobile telephone number (wherein the user 110 employs the devices 130 for reading mail and receiving calls from the services 120). In a particular variant aspect, the user 110 interacts with the service 120 by means of certain devices 130 in a one-way direction. For example, the user 110 in no way interacts with the service 120 by means of SMS messages, yet they receive these from the service 120. In one variant aspect, the user 110 may interact with the service by means of different devices 130 (for example, to check email or make use of social networks by means of a personal computer and smartphone).

Data about the users in a particular form is stored by the service 120, in the general case by using the infrastructure of the service 120, such as in a database 125 or other types of storage modules. Ordinarily the user 110 carries out a registration procedure (hereinafter, registration), providing the service 120 with personal information with varying degrees of identification of the user 110. In one instance, this might be, for example, a registration at the service 120 requiring an email with confirmation of the registration. In another instance, for example, the registration of the user 110 occurs by going to a fitness club to make a contract with that fitness club, entering passport and other data in the contract.

Figure 2:
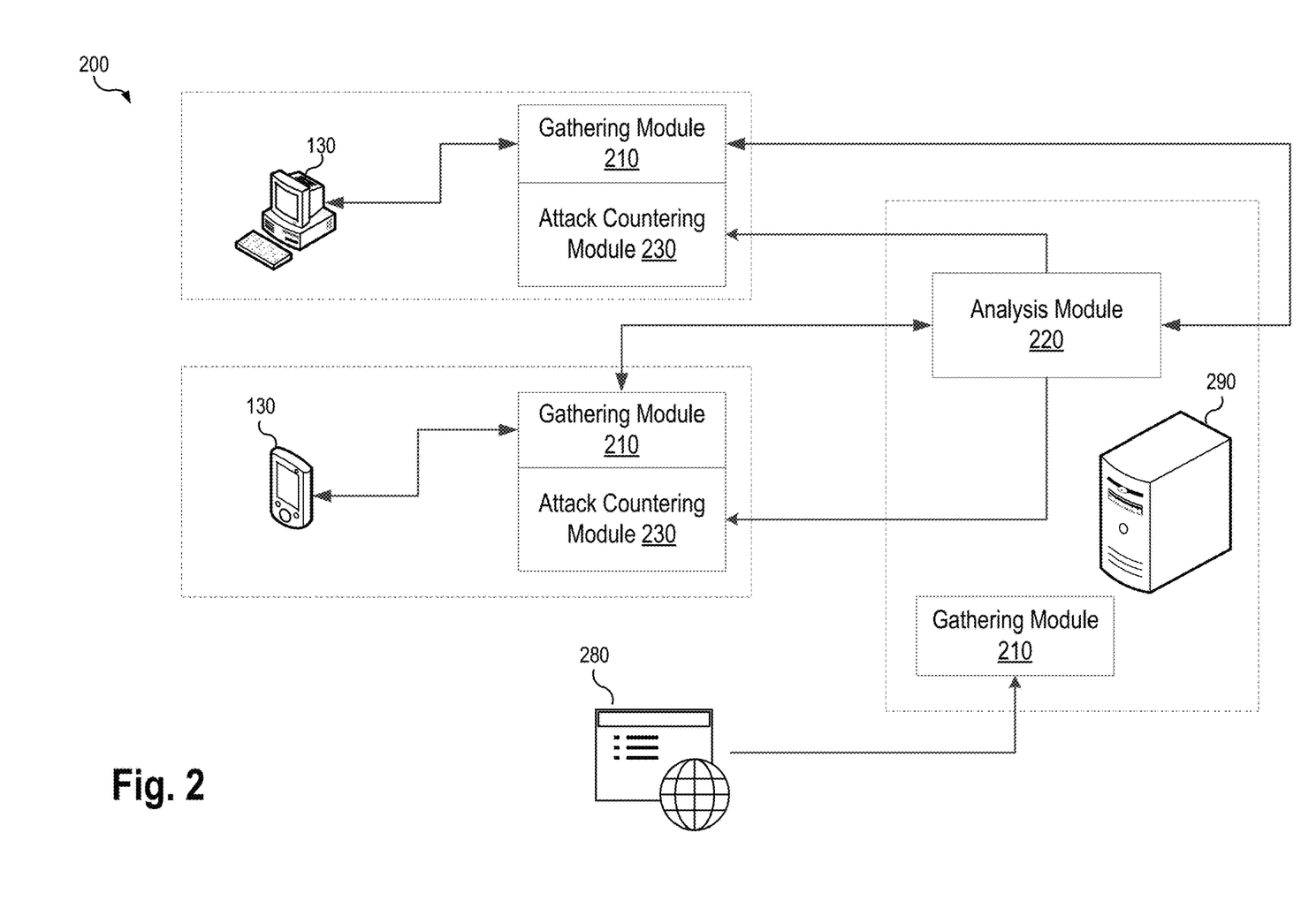
FIG. 2 shows is a block diagram of a system for countering an attack on computing devices by means of which users are interacting with services keeping data on the users, according to an aspect.

FIG. 2 shows is a block diagram of a system 200 for countering an attack on computing devices by means of which users are interacting with services keeping data on the users, according to an aspect. It should be noted that, in one variant aspect of the system, the data on the users is their personal data. In some aspects, the personal data may be personally identifiable information (PII). In some aspects, the personal data may be subject to data policies and regulations that are specify restrictions on the gathering, storing, accessing, disseminating and processing of such data. In some aspects, the data on the users may include data used to authenticate the user with the service, such as a username, password, security questions, other login credentials, and/or information derived therefrom (e.g., hash values of passwords).

The system 200 for countering an attack on the computing devices 130 by means of which the users 110 interact with services 120 keeping data on the users is generally part of a security application (such as an antivirus application) and includes a gathering module 210, an analysis module 220, and an attack countering module 230.

The gathering module 210 in the aspect is generally implemented on the devices 130 by means of which the users 110 interact with the services 120. The gathering module 210 may be in the form of the known components of antivirus applications, such as an antispam module, antiphishing module, or caller ID modules (such as made available in Kaspersky WhoCalls®). The gathering module 210 is configured to collect data on the services 120 with which the user 110 interacts, and data on the devices 130 by means of which the user 110 interacts with the services 120.

In one aspect, the data on the services 120 (i.e., data about the service) may include (but is not limited to) the type of service 120 (a site, email, organization), the personal data of the users 110 gathered by the service 120, the location of the service 120, and the purpose of the interaction with the service 120. In an aspect, the data on the devices 130 (i.e., data about the devices) may include (but is not limited to) the type of device 130 (smartphone, tablet, notebook), the operating system under which the device 130 is running, data on the application on the device 130 by means of which the user 110 interacts with the service 120, known vulnerable applications installed on the device 130, installed security patches for the operating system (OS) of the device 130 and applications, and the location of the device 130.

In one variant aspect, the gathering module 210 also gathers data revealing an attack occurring as a result of leakage of data on the users from at least one aforementioned service 120. Data leakage or a data breach generally occurs in the event of a successful attack on the service 120 by the hackers gaining access to the data on the users 110. After this, making use of various techniques of social engineering, malicious programs and links, the hackers may attempt to influence the user 110 or their devices 130 in order to obtain unauthorized access to personal (confidential) data of the user. The attack is detected on the basis of at least one rule for the detecting of an attack, for example, if the user 110 received an email with an attachment from an unknown address, or if they received a call from an unknown number of a particular cellular operator. In the general case, these rules may be changed and described by more detailed heuristics. In one variant aspect, the rules are formulated automatically on the basis of statistical data. In another variant aspect, the rules are formulated with the involvement of an expert in computer security. In the general case, said rules are kept at a remote server and may be received by the gathering module 210 from the analysis module 220.

In an exemplary aspect, the data gathered is anonymous. In one aspect, the data gathered has been modified (e.g., by the gathering module) to anonymize the data.

In one variant aspect, information is received on the actions carried out to counter an attack from the attack countering module 230. In the event that an attack was previously identified in accordance with at least one rule, the gathering module 210 identifies the previously identified attack on the devices 130 of other users 110 of a cluster (described below) formulated by the analysis module 220, and sends to the analysis module 220 information including the actions performed and whether an attack is detected with the aid of the mentioned rule after the actions performed.

In one variant aspect, the gathering module 210 is implemented on a remote server 290 or as a cloud service. The gathering module 210 in this case gathers and analyzes the data of services 120 keeping data on users 110 which are accessible on the Internet 280, and also on networks accessible by means of the Internet (such as the Tor network). In one variant aspect, an analysis is done for data which has "leaked" to the network, for example, user databases which are sold or handed out free of charge. Many cases of "leaks" of databases are known, being possibly banking databases, and user email addresses, and also databases of various organizations with which the users 110 are interacting.

The data gathered by the gathering module 210 is sent to the analysis module 220.

The analysis module 220 may be implemented on a remote server 290 or as a cloud service. In the general case, the analysis module 220 is configured to create (formulate) clusters of devices 130 by means of which the users 110 interact with the services 120, on the basis of the data obtained from the gathering module 210.

In one variant aspect, said clusters are created continually. For example, after a particular interval of time, the analysis module 220 performs an analysis to determine with which services 120 and by means of which devices 130 the users 110 interact. In one variant aspect, the analysis module 220 may exclude the devices 130 of users 110 from the clusters under certain conditions. For example, responsive to determining that a user 110 did not interact with a service 120 by means of a device 130 for some time, or in response to determining that the device 130 itself has long been absent from the user 110, the analysis module 220 may exclude the device from the formulated clusters.

In another variant aspect, the clusters are created dynamically, at the moment of appearance of the actual attack, i.e., in response to detecting a contemporaneous cyber-attack.

As has been described in the examples above, an attack on a device 130 may be identified on the basis of rules. On the basis of an actual attack, the analysis module 220 identifies an attack vector of the attack. The attack vector is the direction or specific method of acting on the device 130 on the part of the hacker upon realization of the threat to the security. In an aspect, the attack vector may be a path or technique used by a hacker or malicious actor to gain unauthorized access to the device 130 or service 120. In realizing the threat to the security, a hacker may exploit various vulnerabilities, including an inadequate level of protection, misconfigurations or bugs in the system software and application software, as well as security flaws in network protocols of the information system.

The characteristics defining an attack vector may include (i) a source or group of sources of the attack, (ii) an element or group of elements which are the target of the attack, (iii) a type of action, and (iv) instruments of the action.

The source of an attack is generally a service 120 with which a user 110 is interacting. During an attack, the service 120 distributes links, SMSs, or emails. It should be noted that the source in a particular case might not be a service 120. For example, a malicious file might be obtained on a compact disk or a flash drive. However, even in this case analysis module 220 may discover the link to the source of the attack, for example, the disks or drives were obtained by the users from a particular service 120 (for example, from a fitness club or a restaurant as part of a PR campaign).

The elements which are the target of the attack are generally the devices 130 of a user 110 or various users 110. The attack may occur on several devices 130 of users at the same time, for example, for a greater coverage and better likelihood of success of the attack on the part of the hackers. If the hackers have gained access to the data of a user 110 containing their email and telephone number, the user 110 might receive emails and telephone calls at the same time.

Examples of the types of (malicious) action have been discussed above. A type of malicious action may include a link, an SMS or an email, text, audio and video messages on answering machines, as well as calls to answering machines (from people or robots).

The instruments of the action are malicious files, scripts, text containing social engineering techniques (when the hacker tries to obtain from a user, by SMS or in a social network, their bank card data for example), or an unwanted call.

Thus, "leaked" databases, the registration of users on Internet sites (such as Avito), temporary hacking of sites by intruders (such as temporary hacking of a news site or a site devoted to computer gaming or a particular subject), allows the hackers to carry out an attack on devices 130 on the basis of the data obtained on the users 110.

In one variant aspect, in identifying the attack vector, the analysis module 220 compares the characteristics of the attack vector with attacks on devices 130 of other users 110. If there is a match with the characteristics of an attack vector on at least one device 130 of another user 110 whose devices belong to the corresponding cluster, the analysis module 220 will send data about the attack to the attack countering module 230 on the devices 130 included in the corresponding cluster. In one variant aspect, the analysis module 220 will also send information on at least one action which needs to be carried out to counter the attack.

In one variant aspect, the analysis module 220 receives, from the gathering module 210, information on previously conducted actions and information on when the rule for detecting an attack was triggered after the actions were undertaken. On the basis of the data obtained from the gathering module 210, the analysis module 220 analyzes the effectiveness of the actions taken to counter the attack. In the general case, the actions taken are considered to be effective if as a result no attack is detected by the aforesaid rule of detecting an attack on the devices 130 of other users 110.

In one variant aspect, the analysis module 220 uses an interaction (communication) with the user 110 themselves as feedback (for example, by SMS, email, messenger, phone call). On the basis of the feedback, the analysis module 220 discovers whether the attack was correctly determined (identified or detected) or whether the user 110 considers the attack to be a false alarm.

In one variant aspect, the analysis module 220 receives information from the user 110 as to their hypotheses on the source of the data leak. For example, the user was not previously receiving SMS (spam) mailing, but they recently signed up with a sports club, and spam mailing on the theme of sports begun. The user believes that the mailing began after signing up with that club. Such information is used by the analysis module 220 for a more accurate formulation of the clusters of devices 130 and the identifying of attack vectors.

In one variant aspect, the analysis module 220 in the event of identifying clusters of devices 130 and attack vectors will notify the users 110 as to the source of leakage of data on the users. It is noted that the user may seek sue or bring lawsuit for damages, or break off contractual relations and demand that their data be removed from this service 120, although that will only be possible for new, and not old, data leaks. In yet another variant aspect, the analysis module 220 will notify the service 120 from which the leakage of data on users 110 has occurred, so that the service 120 may perform an audit of its security systems, identify the cause of the leak, and take steps to prevent a repeat of the leak, for example. Moreover, in this case the service 120 may notify the other users 110 as to the leak on its own.

The attack countering module 230 in the general aspect is implemented on the devices of a user 110 by means of which the user 110 is interacting with the services 120. In the general case, the attack countering module 230 carries out the actions obtained from the analysis module 220 to counter the attack. In one example, the attack countering module 230 may transmit a text warning about the attack. In another example, the attack countering module 230 may add a link (e.g., URL or HTML that includes the URL) to the blocking list, add a telephone number to the blocking list (both in a telephone and in answering machines), and/or add the sender's email address to the blocking list. In another example, the attack countering module 230 may remove a file from the operating system (OS) cache or a given application by a particular pathway. In another example, the attack countering module 230 may automatically switch to an "enhanced" mode of the security application technologies responsible for countering attacks from the vector corresponding to the given cluster of devices 130.

In one variant aspect, the attack countering module 230 sends information about the actions carried out to the gathering module 210. Given what was described above, it should be understood that if the gathering module 210 ceases to identify an attack on the basis of the rules for detecting an attack (for example, the user received an SMS with a link but did not click on it, because the link was added to the blocking list), data about this will also be sent to the analysis module 220 to assess the effectiveness of the chosen actions for the countering of the attack. This is important because of the diversity of devices 130 and privileges of the security application. Thus, for example, depending on the operating system, a security application may have different privileges, and therefore the same attack countering action will not always be suitable for different devices 130 of the same type (such as a mobile telephone) (since, for example, the security application has a different set of privileges in the OS Android and the iOS).

The following situation may serve as an example of the operations of the system 200 described herein. A successful cyber-attack resulting in a database leak has occurred at a cryptocurrency exchange service that legally trades cryptocurrency assets. Some of the registered users of the exchange service underwent a verification, other users made a withdrawal of funds on bank cards, so that personal data (passport photographs, telephone numbers, bank card numbers) has become accessible to the hackers. Thus, the mentioned exchange is a service 120 keeping data on users 110. The service 120 did not have adequate protection and software to prevent the leakage of its databases, and therefore it is necessary to protect the users 110 whose data has become accessible to the hackers. It should be noted that in such a situation one or more different (subsequent) attacks may occur from different groups of hackers, if the database with the data of the users 110 is accessible to the public. That is, one or more subsequent cyber-attacks may occur using the personal data contained in the database with the data of the users 110.

The hackers begin the subsequent attack(s) with various vectors. For example, the hackers send out messages with malicious attachments (phishing links and key logger programs) by email, they call the bank using the passport data and the card number of the user 110 (e.g., social engineering), they call and send out SMSs and contact the user 110 via social networks seeking to obtain additional data of the user 110.

The gathering module 210 collects data on such SMSs, calls and emails according to the attack detection rules. For example, the gathering module 210 may collect data based on a rule having the condition of an email from an unknown sender contains the address of a cryptocurrency basket and a proposal with key words about investing. Furthermore, the gathering module 210 previously gathered data about the fact that the users interact with the mentioned exchange service. Furthermore, the gathering module 210 discovered the mentioned database with the data on the users 110 on a specialized forum in the network Tor.

After sending the data to the analysis module 220, the clusters of the devices 130 of the users 110 were formulated. The users 110 employ various mobile devices and PCs under the control of different operating systems. Furthermore, the attack vectors were determined by the analysis module 220. The analysis module 220 selected the actions for countering the attack for the devices 130 in dependence on the type of devices 130 and the OS of the devices 130. These actions were dispatched to the devices 130 of the users 110 and carried out by the attack countering module 230.

As a result, some of the attack vectors ceased to appear (or the number of appearances decreased significantly), while others remained unchanged. The data obtained by the analysis module 220 from the gathering module 210 after carrying out the actions by the attack countering module 230 allows the analysis module 220 to calculate the effectiveness of the action employed. If this is lower than a threshold value, other or additional actions will be selected and sent to the attack countering module 230.

The described method of operations of the system 200 continues, and upon discovering a new attack the sequence of actions of the system is repeated.

Figure 3:
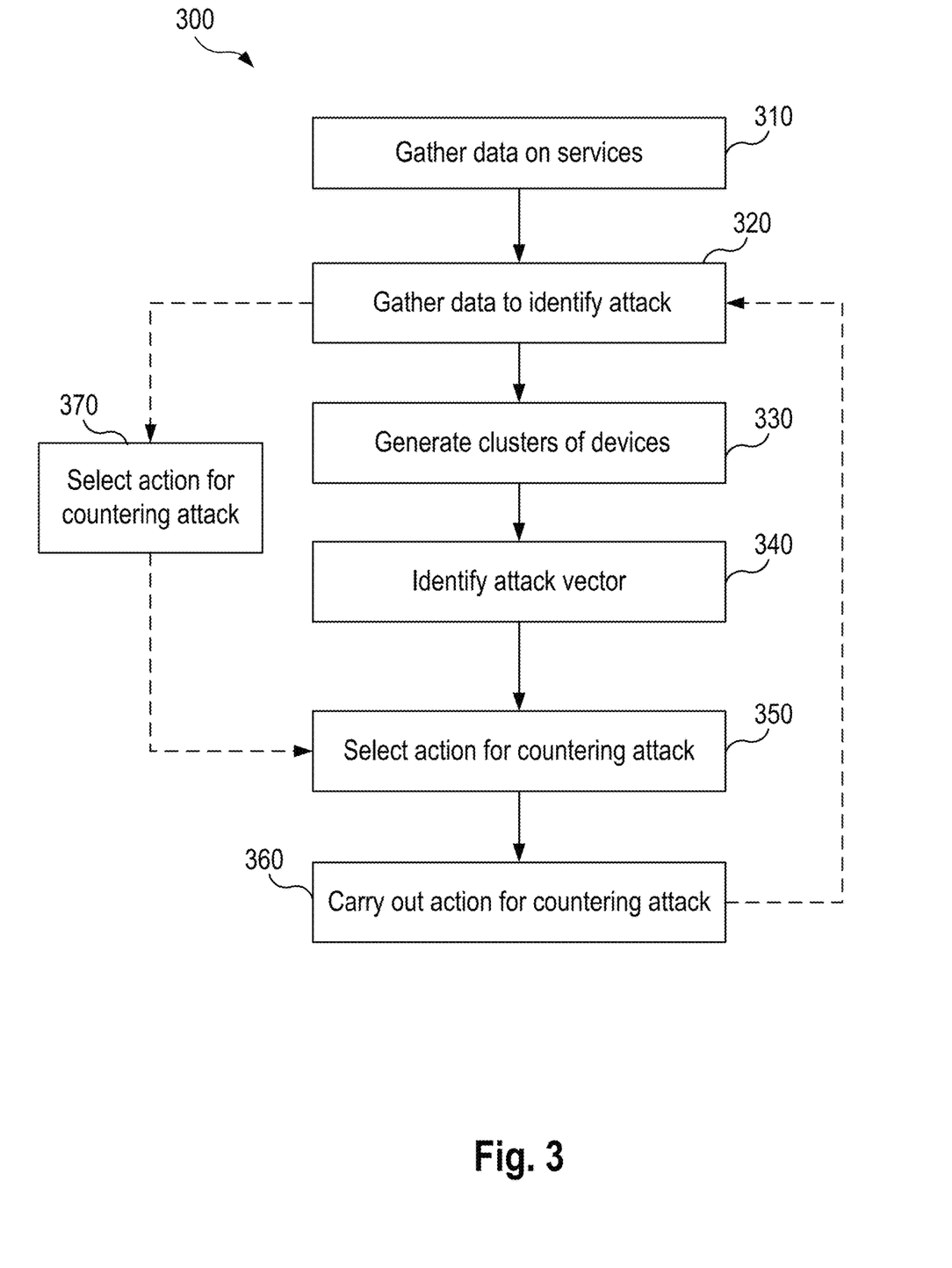
FIG. 3 is a flow diagram of a method for countering an attack on computing devices by means of which users are interacting with services keeping data on the users, according to an exemplary aspect.

FIG. 3 is a flow diagram of a method 300 for countering an attack on computing devices by means of which users are interacting with services keeping data on the users, according to an exemplary aspect.

In step 310, the gathering module 210 is used to gather data on the mentioned services 120 with which the users 110 are interacting by means of the devices 130, and data on the mentioned devices 130. In one variant aspect, the gathering module 210 is further designed to collect data accessible on the Internet about the services 120 keeping data on users 110. In one aspect, the gathering module 210 (e.g., executing on the remote server 290) may receive service data associated a service 120 (e.g., an online service, brick-and-mortar service) that gathers and stores personal data of a plurality of users 110. In one aspect, the gathering module 210 may receive device data associated with a plurality of computing devices 130 associated with the plurality of users 110 and that are configured to interact with the service 120. In an aspect, the received service data may include a publicly-accessible leaked database of at least a portion of the personal data of the plurality of users. In some aspects, the received service data specifies at least one of a type of the service, personal data of the plurality of users gathered by the service, a location of the service, and a purpose of a user interaction with the service. In some aspects, the received device data specifies, for each of the plurality of computing devices, at least one of a type of the respective computing device, an operating system under which the respective computing device is running, and data of an application on the respective computing device by means of which a user interacts with the service.

In step 320, the gathering module 210 is used to collect data on a device which identifies an attack occurring as a result of leakage of data on users 110 from at least one aforementioned service 120, the attack being identified on the basis of at least one rule for detecting an attack. The data collected is sent to the analysis module 220.

In one aspect, the analysis module 220 may detect (e.g., based on the received service data and device data) a cyber attack on at least one of the plurality of computing devices 130 is occurring as a result of a data breach of the personal data of the users 110 from the service 120. In some aspect, the analysis module 220 may detect the cyber attack is detected based on a rule having a condition that the cyber attack includes a reference to the service and uses personal data from the data breach. For example, the analysis module 220 may analyze the service data indicating a data breach has occurred of a cryptocurrency exchange service, of which a first user is a member and has an email address <john@email.com> listed as their contact information (i.e., personal data). The analysis module 220 may analyze the device data from a first computing device indicating the first device received a suspicious email addressed to the leaked email address <john@email.com>, referencing the cryptocurrency exchange service, or in other cases, contains the address of a cryptocurrency transaction and a proposal with keywords about cryptocurrency investing. The suspicious email may be sent from an unverified or unknown sender and/or may contain a phishing link.

In an aspect, the analysis module 220 may determine the attack based on information received from the user 110 indicating a hint or suggestion as to a source of a data leak. The received hint may indicate a candidate source of the data leak. For example, a user was not previously receiving SMS (spam) mailing, but they recently signed up with a sports club, and spam mailing on the theme of sports begun. In this example, the analysis module 220 may receive an indication form the user that the user believes that the mailing began after signing up with that club. Such information is used by the analysis module 220 for a more accurate formulation of the clusters of devices 130 and the identifying of attack vectors.

In step 330, the analysis module 220 is used to form clusters of devices 130 by means of which the users 110 are interacting with the services 120 keeping data on the users, on the basis of the data collected by the gathering module 210. In an aspect, the analysis module 220 may generate a cluster of a subset of the plurality of computing devices 130 based on the received service data and device data.

In step 340, the analysis module 220 is used to identify the attack vector on the basis of the characteristics of the attack vector. The characteristics determining the attack vector may be at least (i) the source or group of sources of the attack; (ii) the element or group of elements which are the target of the attack; (iii) the type of action; and (iv) the instruments of the action.

In an aspect, the analysis module 220 may identify an attack vector of the cyber attack based on the received device data. In some aspects, identifying the attack vector of the cyber attack based on the received device data may include determining a source of the cyber attack comprises the service with which a first user is interacting. In some aspects, identifying the attack vector of the attack based on the received device data includes determining that a group of elements which are the target of the attack, wherein the group of elements includes an email address of a first user and a telephone number of the first user. For example, if the hackers have gained access to the personal data of a user 110 containing their email address and their telephone number, the user 110 might receive emails and telephone calls at the same time. In other aspects, identifying the attack vector of the attack based on the received device data may include determining a type of malicious action, and/or determining instruments of the action.

In step 350, the analysis module 220 is used to select at least one action for countering the attack and this is sent to the attack countering module 230 for the devices 130 of all users 110 of the corresponding cluster in the event that a match is found in the characteristics of the attack vector for at least one device 130 of another user 110 whose devices 130 belong to the corresponding cluster. In an aspect, the analysis module 220 may determine an action for countering the cyber attack based on the identified attack vector, and transmit a specification of the action to the subset of computing devices 130 in the cluster. In some aspects, the action for countering the cyber attack is further determined based on a match in characteristics of the attack vector for at least one computing device of another user whose computing devices belong to the cluster. For example, an action for countering the cyber attack is sent to a computer security module (e.g., attack countering module 230) on the devices 130 of all users 110 of the corresponding cluster in the event that a match is found in the characteristics of the attack vector for at least one device 130 of another user 110 whose devices 130 belong to the corresponding cluster.

In step 360, the attack countering module 230 is used to carry out actions to counter the attack on the computing devices 130 of the users 110.

In one variant aspect, in step 370, performed after step 320, the analysis module 220 further analyzes on the basis of the data obtained from the gathering module 210 the effectiveness of the actions carried out to counter the attack. In the general case, the actions carried out are deemed to be effective if as a result no attack is detected by the aforementioned rule for detecting an attack on the devices 130 of other users 110. In an aspect, the analysis module 220 may determine an efficacy of the action for countering the cyber attack based on diagnostic data received from the plurality of devices; and modify one or more rules for detecting and countering cyber attacks based on the determined efficacy.

Figure 4:
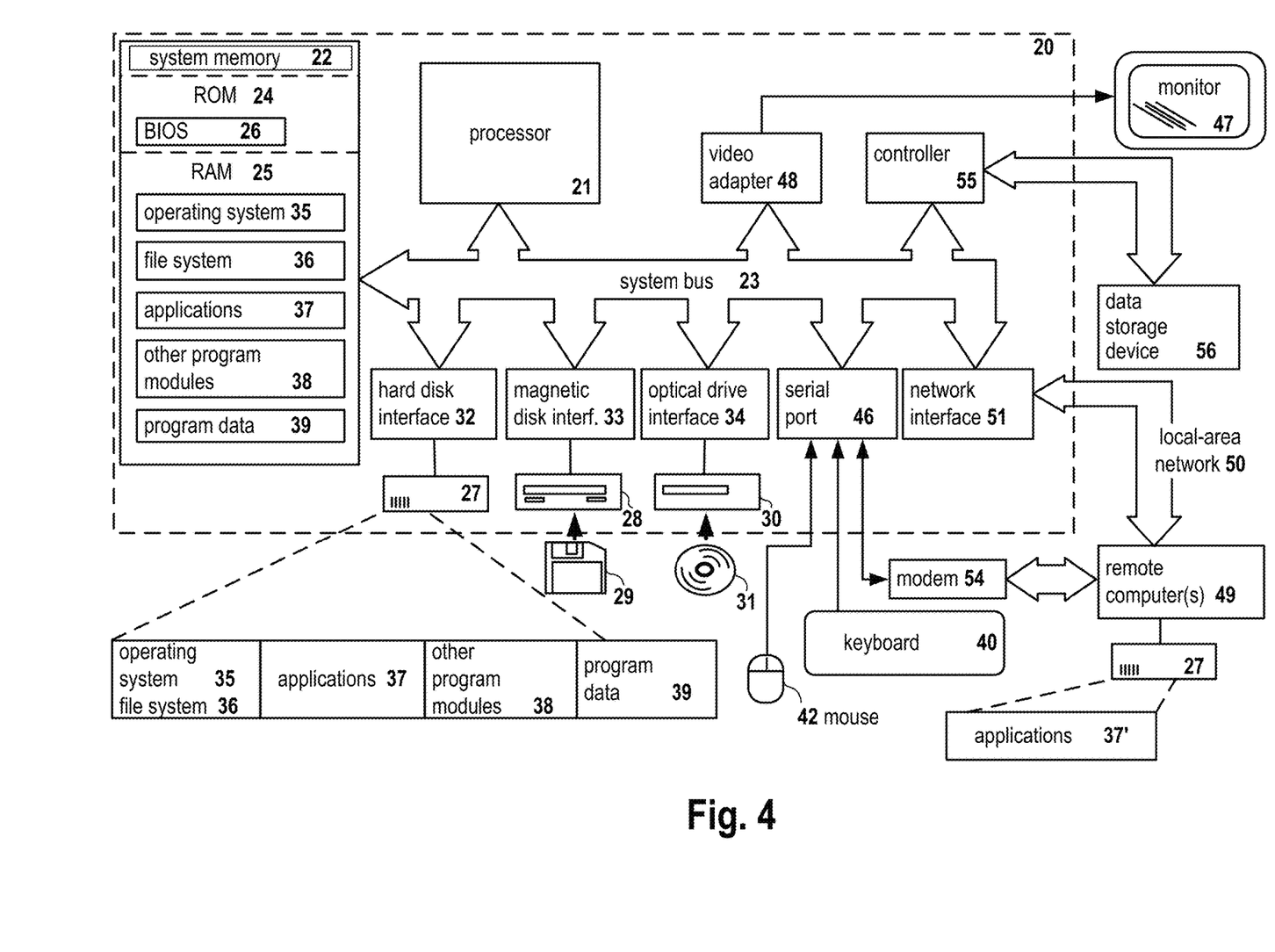
FIG. 4 shows an example of a computer system in which aspects of the present disclosure may be implemented.

FIG. 4 is a block diagram illustrating a computer system 20 on which aspects of systems and methods for countering an attack on computing devices by means of which users are interacting with services keeping data on the users may be implemented in accordance with an exemplary aspect. It should be noted that the computer system 20 can correspond to the computing devices 130, servers of the service 120, and remote server(s) 290, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for countering a cyber attack on computing devices of users interacting with an online service that stores personal data of the users, the method comprising:
   collecting, by a security server, service data associated with the online service and device data of the computing devices;
   detecting, by the security server, based at least on the collected service data, a data breach, at the online service, of the personal data of the users;
   detecting, by the security server, based at least on the collected service data and device data, a cyber attack on one or more computing devices related to the data breach at the online service;
   identifying, by the security server a cluster of the computing devices of different users of the online service experiencing the same cyber attack;
   identifying, by the security server, from the device data of computing devices in the cluster, attack vectors based on the characteristics of the cyber attack experienced by one or more computing devices in the cluster;
   determining, by the security server, one or more actions for countering the cyber attack based on the identified attack vector; and
   transmitting, by the security server, to the computing devices in the cluster, the determined actions for countering the cyber attack.

2. The method of claim 1, wherein identifying, by the security server, the attack vectors of the cyber attack based on the collected device data comprises determining a source of the cyber attack, the source of the cyber attack comprising the service with which a user is interacting using one or more computing devices or the service from which malicious files were obtained using the one or more computing devices.

3. The method of claim 1, wherein the cyber attack is identified based on a plurality of heuristic rules for detecting a cyber attack.

4. The method of claim 3, further comprising:
   determining, by the security server, whether the cyber attack was previously identified using one or more of the plurality of heuristic rules; and
   identifying, by the security server, one or more previously determined actions for countering the cyber attack based on the one or more of the plurality of heuristic rules.

5. The method of claim 1, wherein identifying, by the security server, the attack vectors of the cyber attack based on the collected device comprises determining a type of malicious action, and/or determining instruments of the malicious action.

6. The method of claim 1, wherein identifying, by the security server, the attack vectors of the cyber attack based on the collected device data comprises determining that a group of elements are the target of the cyber attack, wherein the group of elements includes an email address of a user and a telephone number of the user.

7. The method of claim 1, wherein the collected service data includes a publicly-accessible leaked database of at least a portion of the personal data of the users.

8. The method of claim 1, further comprising:
   receiving information from users indicating users' hypotheses on a source of the detected data breach.

9. A system for countering a cyber attack on computing devices of users interacting with an online service that stores personal data of the users, the system comprising:

a hardware processor configured to:
collect service data associated with the online service and device data of the computing devices;
detect, based at least on the collected service data, a data breach, at the online service, of the personal data of the users;
detect, based at least on the collected service data and device data, a cyber attack on one or more computing devices related to the data breach at the online service;
identify a cluster of the computing devices of different users of the online service experiencing the same cyber attack;
identify from the device data of computing devices in the cluster, attack vectors based on the characteristics of the cyber attack experienced by one or more computing devices in the cluster;
determine one or more actions for countering the cyber attack based on the identified attack vector; and
transmit to the computing devices in the cluster, the determined actions for countering the cyber attack.

10. The system of claim 9, wherein the processor configured to identify the attack vectors of the cyber attack based on the collected device data is further configured to determine a source of the cyber attack, the source of the cyber attack comprising the service with which a user is interacting using one or more computing devices or the service from which malicious files were obtained using the one or more computing devices.

11. The system of claim 9, wherein the cyber attack is identified based on a plurality of heuristic rules for detecting a cyber attack.

12. The system of claim 11, wherein the processor is further configured to:
determine whether the cyber attack was previously identified using one or more of the plurality of heuristic rules; and
identify one or more previously determined actions for countering the cyber attack based on the one or more of the plurality of heuristic rules.

13. The system of claim 9, wherein the processor configured to identify the attack vectors of the cyber attack based on the collected device is further configured to determine a type of malicious action, and/or determine instruments of the malicious action.

14. The system of claim 9, wherein the processor configured to identify the attack vector of the cyber attack based on the collected device data is further configured to determine that a group of elements are the target of the cyber attack, wherein the group of elements includes an email address of a user and a telephone number of the user.

15. The system of claim 9, wherein the collected service data includes a publicly-accessible leaked database of at least a portion of the personal data of the users.

16. The system of claim 9, wherein the processor is further configured to:
receive information from users indicating users' hypotheses on a source of the detected data breach.

17. A non-transitory computer readable medium comprising computer executable instructions for countering a cyber attack on computing devices of users interacting with an online service that stores personal data of the users, including instructions for:
collecting service data associated with the online service and device data of the computing devices;
detecting, based at least on the collected service data, a data breach, at the online service, of the personal data of the users;
detecting, based at least on the collected service data and device data, a cyber attack on one or more computing devices related to the data breach at the online service;
identifying a cluster of the computing devices of different users of the online service experiencing the same cyber attack;
identifying, from the device data of computing devices in the cluster, attack vectors based on the characteristics of the cyber attack experienced by one or more computing devices in the cluster;
determining one or more actions for countering the cyber attack based on the identified attack vector; and
transmitting to the computing devices in the cluster, the determined actions for countering the cyber attack.

18. The non-transitory computer readable medium of claim 17, wherein the instructions for identifying the attack vectors of the cyber attack based on the collected device data further comprise instructions for determining a source of the cyber attack, the source of the cyber attack comprising the service with which a user is interacting using one or more computing devices or the service from which malicious files were obtained using the one or more computing devices.

19. The non-transitory computer readable medium of claim 17, wherein the cyber attack is identified based on a plurality of heuristic rules for detecting a cyber attack.

20. The non-transitory computer readable medium of claim 17, wherein the instructions for identifying the attack vectors of the cyber attack based on the collected device further comprise instructions for determining a type of malicious action, and/or determining instruments of the malicious action.

* * * * *